3,519,652
BIS-CHROMONYL COMPOUNDS
Colin Fitzmaurice and Thomas Brian Lee, Holmes Chapel, England, assignors to Fisons Pharmaceuticals Limited, Loughborough, Leicestershire, England
No Drawing. Filed July 3, 1967, Ser. No. 650,627
Claims priority, application Great Britain, July 5, 1966, 30,149/66; July 14, 1966, 31,667/66
The portion of the term of the patent subsequent to Dec. 31, 1985, has been disclaimed
Int. Cl. C07d 7/34
U.S. Cl. 260—345.2     23 Claims

ABSTRACT OF THE DISCLOSURE

New compounds of the formula

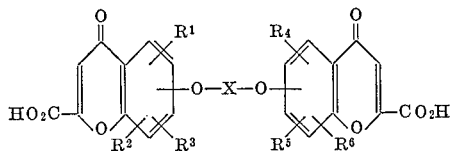

and functional derivatives thereof, in which at least one of $R^1$, $R^2$, $R^3$, $R^4$, $R^5$ and $R^6$ is a substituent other than a hydrogen atom, halogen atom or alkyl or substituted alkyl group, and the remainders of $R^1$, $R^2$, $R^3$, $R^4$, $R^5$ and $R^6$ are the same or are different and each is hydrogen or a substituent other than hydrogen, and X is a straight or branched polymethylene chain which may be interrupted by one or more carbocyclic or heterocyclic rings, oxygen atoms or carbonyl groups, possess special activities as inhibitors of the effects of certain types of antigen-antibody reaction.

---

This invention is concerned with improvements in or relating to new chemical compounds and pharmaceutical compositions containing them.

It has now been found that certain new chromone derivatives, as hereinafter defined, possess special activity as inhibitors of the effects of certain types of antigen-antibody reaction, as evidenced, for example, by both in vitro and in vivo tests.

According to the invention, therefore, there are provided as new compounds bis-chromonyl compounds of the formula:

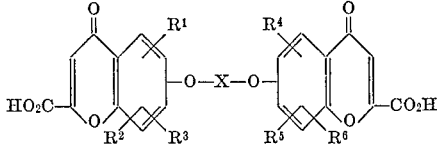

and functional derivatives thereof, in which at least one of $R^1$, $R^2$, $R^3$, $R^4$, $R^5$ and $R^6$ is a substituent other than a hydrogen atom, halogen atom or alkyl or substituted alkyl group, and the remainder of $R^1$, $R^2$, $R^3$, $R^4$, $R^5$ and $R^6$ are the same or are different and each is hydrogen or a substituent other than hydrogen, and X is a saturated or unsaturated, substituted or unsubstituted, straight or branched polymethylene chain which may be interrupted by one or more carbocyclic or heterocyclic rings, oxygen atoms or carbonyl groups.

Examples of $R^1$, $R^2$, $R^3$, $R^4$, $R^5$ and $R^6$, include alkyl groups (e.g. methyl and ethyl groups); substituted alkyl groups (e.g. haloalkyl, hydroxyalkyl, alkoxyalkyl, acetoxyalkyl, carboxyalkyl, aminoalkyl, alkylaminoalkyl, dialkylaminoalkyl, hydroxylaminoalkyl and hydrazinoalkyl groups), unsaturated alkyl groups (e.g. alkenyl and alkynyl groups such as allyl and propargyl groups); aralkyl groups (e.g. benzyl and phenethyl groups); substituted aralkyl groups (e.g. haloaralkyl and alkylaralkyl groups); aryl groups (e.g. phenyl and naphthyl groups); substituted aryl groups (e.g. alkaryl, haloaryl, nitroaryl, carboxyaryl and hydroxyaryl groups); heterocyclic groups (e.g. pyridyl, furyl or pyrrolyl groups); substituted heterocyclic groups; cycloalkyl groups (e.g. cyclopentyl or cyclohexyl groups); substituted cycloalkyl groups (e.g. hygroups; iminoether groups, amidine groups; nitro groups; nitroso groups; hydroxy groups; alkoxy groups (e.g. methoxy or ethoxy groups), substituted alkoxy groups (e.g. hydroxyalkoxy, alkoxyalkoxy, carboxyalkoxy, haloalkoxy, aminoalkoxy, alkylaminoalkoxy, or dialkylaminoalkoxy groups); unsaturated alkoxy groups (i.e. alkenyloxy or alkynyloxy groups); aralkyloxy groups (e.g. a benzyloxy group); substituted aralkoxy groups; aryloxy groups (e.g. phenyloxy or naphthyloxy groups); substituted aryloxy groups, heteroyloxy groups (e.g. a pyridyloxy group); cycloalkyloxy groups (e.g. cyclohexyloxy or cyclopentyloxy groups); epoxyalkoxy groups; amino groups; alkylamino groups (e.g. ethylamino and propylamino groups); dialkylamino groups (e.g. dimethylamino and diethylamino groups); cycloalkylamino groups; arylamino groups (e.g. phenylamino and naphthylamino groups); diarylamino groups (e.g. a diphenylamino group); haloalkylamino groups; alkenylamino groups; aminoalkylamino groups, amine oxide groups, oxime groups; hydroxylamine groups; azo groups, hydrazino groups; hydrazide groups; hydrazone groups; heterocyclic amino groups; imide groups; urea groups; thiourea groups, guanidine groups; thiol groups; alkyl thiol groups; substituted alkyl thiol groups; aryl thiol groups; substituted aryl thiol groups; and halogen atoms (e.g. chlorine bromine, or iodine atoms):

Additionally, an adjacent pair of $R^1$, $R^2$ and $R^3$ together with the adjacent carbon atoms or an adjacent pair of $R^4$, $R^5$ and $R^6$, together with the adjacent carbon atoms may form a ring system, e.g. a carbocyclic ring system such as a cyclohexane, cyclopentane or benzene ring or a heterocyclic ring system such as a pyran or furan ring:

Where a pair of $R^1$, $R^2$ and $R^3$ or a pair of $R^4$, $R^5$ and $R^6$ ortho or para to each other both represent hydroxy groups, e.g. a compound of the formula:

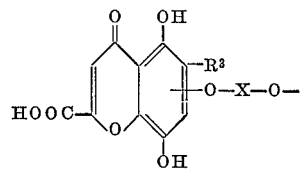

the corresponding quinone, e.g. of the formula:

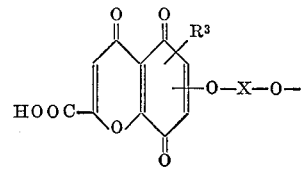

may be obtained and such compounds are also included within the scope of the invention.

Preferred compounds according to the invention are those in which at least one of $R^1$, $R^2$, $R^3$, $R^4$, $R^5$ and $R^6$ is a hydroxy, alkoxy (e.g. methoxy, ethoxy, propoxy or butoxy), substituted alkoxy group (e.g. a hydroxyalkoxy, alkoxyalkoxy or carboxyalkoxy group), unsaturated alkyl (e.g. an alkenyl group such as an allyl group), a nitro group, an amino group or a cyano group; the remainder of $R^1$, $R^2$, $R^3$, $R^4$, $R^5$ and $R^6$ are the same or are different and each is a hydrogen atom, an alkyl group, a substituted alkyl group or a halogen atom, and X is a saturated or unsaturated, straight or branched, substituted or unsubstituted polymethylene chain which may be interrupted by one or more carbocyclic or heterocyclic rings, oxygen atoms or carbonyl groups.

Particularly preferred compounds according to the invention are those of the formula:

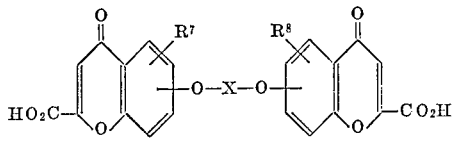

and functional derivatives thereof, in which $R^7$ and $R^8$ are the same or are different and each is a hydroxy group, an alkoxy group, a substituted alkoxy group, an unsaturated alkyl group, a nitro group, an amino group or a cyano group; and X has the meaning defined above.

The group X may be any of a wide variety of groups. Thus, for example, it may be a straight or branched saturated or unsaturated hydrocarbon chain. Further, X may be such a chain interrupted by one or more oxygen atoms, carbonyl groups or carbocyclic or heretocyclic rings and may be substituted by one or more halogen atoms (e.g. chlorine or bromine atoms), or hydroxy or alkoxy groups. Specific examples of the group X are groups of the formulae:

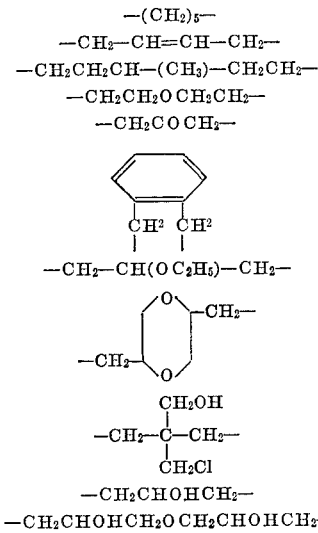

The group X is preferably a straight or branched hydrocarbon chain, which may be interrupted by one or more oxygen atoms, and contains from 3 to 7 carbon atoms. Desirably such a chain is substituted by one or more hydroxyl groups; particularly preferred chains being the 2 - hydroxy-trimethylene chain ($—CH_2 \cdot CHOHCH_2—$) and the 3-hydroxy-pentamethylene chain.

$$(—CH_2 \cdot CH_2 \cdot CHOH \cdot CH_2 \cdot CH_2—).$$

The chain —O—X—O— may link different or corresponding positions on the chromone molecules.

Specific compounds according to the invention which may be mentioned include:

1,3-bis(2-carboxy-7-methoxychromon-5-yloxy)-propan-2-ol;
1,5-bis(2-carboxy-7-methoxychromon-5-yloxy)pentane;
1,3-bis-(2-carboxy-5(2-hydroxypropoxy)chromon-7-yloxy)-propan-2-ol;
1,3-bis(2-carboxy-7-(2-hydroxypropoxy)-chromon-5-yloxy)-propan-2-ol;
1,5-bis(2-carboxy-5-methoxychromon-7-yloxy)-pentane;
1,5-bis(2-carboxy-7-methoxychromon-6-yloxy)-pentane;
1,5-bis(2-carboxy-7-(2-hydroxypropoxy)-chromon-6-yloxy)-pentane;
1,3-bis(5-benzyloxy-2-carboxychromon-7-yloxy)-propan-2-ol;
1,3-bis(2-carboxy-5-methoxy-chromon-7-yloxy)-propan-2-ol;
1,3-bis(2-carboxy-5-hydroxy chromon-7-yloxy)-propan-2-ol;
1,3-bis(8-allyl-2-carboxychromon-5-yloxy)-propan-2-ol;
1,3-bis(8-allyl-2-carboxychromon-7-yloxy)-propan-2-ol;
1-(8-allyl-2-carboxychromon-7-yloxy)-3-(2-carboxychromon-7-yloxy)-propan-2-ol;
1,3-bis(2-carboxy-8-methallylchromon-7-yloxy)-propan-2-ol;
1,3-bis(8-allyl-6-bromo-2-carboxychromon-7-yloxy)-propan-2-ol;
1-(8-allyl-2-carboxychromon-7-yloxy)-3-(2-carboxychromon-6-yloxy)-propan-2-ol;
1,5-bis(8-allyl-2-carboxychromon-7-yloxy)-pentane; and
1,3-bis(2-carboxy-8-nitrochromon-5-yloxy)-propan-2-ol.

Functional derivatives of the compounds according to the invention include salts, esters and amides of one or more of the carboxylic acid functions present and esters of any hydroxylic functions present.

Salts of the bis-chromonyl compounds which may be mentioned are salts with physiologically acceptable cations, for example, ammonium salts, metal salts such as alkali metal salts (e.g. sodium, potassium and lithium salts) and alkaline earth metal salts (e.g. magnesium and calcium salts) and salts with organic bases, e.g. amine salts such piperidine, triethanolamine and diethylaminoethylamine salts.

Esters which may be mentioned include simple alkyl esters (e.g. methyl, ethyl, propyl, isopropyl, butyl and tertiary butyl esters) and amides which may be mentioned include simple amides (for example amides with ammonia and lower alkylamines such as methylamine, ethylamine etc.) and more complex amides with amino acids such as glycine.

The new bis-chromonyl compounds according to the invention have been shown to inhibit the release and/or action of toxic products which arise from the combination of certain types of antibody with specific antigen. In man, it has been found that both subjective and objective changes which result from the inhalation of specific antigen by sensitized subjects are markedly inhibited by prior administration of the new bis-chromonyl compounds. Thus the new compounds are of great value in the treatment of "extrinsic" allergic asthma. It has also been found that the new bis-chromonyl compounds are of value in the treatment of so-called "intrinsic" asthma (in which no sensitivity to extrinsic antigen can be demonstrated). It has also been found that in certain virus/antibody neutralisation systems the new bis-chromonyl compounds enhance the neutralising capacity of the antiserum and thus the new compounds may find use in the treatment of viral infections.

According to a further feature of the invention, therefore, there is provided a pharmaceutical composition comprising a bischromonyl compound according to the invention, preferably in the form of a salt, in association with a pharmaceutical carrier or diluent. There is also provided a process for the manufacture of a pharmaceutical composition which comprises mixing a bis-chromonyl compound with a carrier or diluent.

The nature of the composition and the pharmaceutical carrier or diluent will, of course, depend upon the desired route of administration, i.e., orally, parenterally or by inhalation.

The compositions according to the invention are especially useful for the propylactic treated of asthma, i.e. the compositions are administered to the patient at regular intervals (i.e. 4–6 hourly) in order to inhibit the effects of asthmatic attacks from which the patient may suffer. When employed in this manner, the dosage of composition is preferably such that from 1–50 mg. of active compound are administered to the patient at each administration.

In general, for the treatment of asthma, the compositions will be in a form suitable for administration by inhalation. Thus the compositions may comprise a suspension or solution of the active ingredient in water for administration by means of a conventional nebulizer. Alternatively the compositions may comprise a suspension or solution of the active ingredient in a conventional liquified propellant to be administered from a pressurized container. The compositions may also comprise the solid active ingredient diluted with a solid diluent, e.g. lactose, for administration from a powder inhalation device.

The pharmaceutical composition according to the invention generally contain a minor proportion of bis-chromonyl compound and a major proportion of carrier or diluent. Thus, for example, the solutions for administration by a conventional nebulizer will comprise a dilute solution, e.g. about 0.5%, in sterile water, and compositions comprising suspensions or solutions in pressurised propellants will contain, for example, about 2% of the active bis-chromonyl compound. However, where the composition comprises the solid bis-chromonyl compound diluted with a solid diluent, the diluent may be present in less, equal or greater amount than the solid active ingredient; for example the diluent may be present in an amount of from 50 to 150% by weight of the solid active ingredient.

The invention also includes within its scope a method of inhibiting the effects of the antigen-antibody reaction which comprises the prior application to the area of the antigen-antibody mechanism a therapeutically effective amount of a bis-chromonyl compound according to the invention.

According to a particular embodiment, the invention is for a method of relieving or preventing allergic airway obstruction which comprises administering to the patient a therapeutically effective amount (e.g. 1–50 mg.) at suitable intervals, of a bis-chromonyl compound according to the invention, particularly in the form of a salt.

The new compounds according to the invention are prepared by linking together two chromone-2-carboxylic acids or precursors therefor.

According to a further feature of the invention, therefore, there is provided a process for the preparation of bis-chromonyl compounds of the formula:

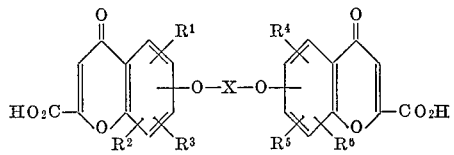

and functional derivatives thereof, in which $R^1$, $R^2$, $R^3$, $R^4$, $R^5$ and $R^6$ have the meanings defined above, which comprises reacting in one or more stages;

(a) A compound of the formula:

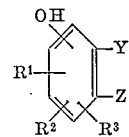

(b) A compound of the formula:

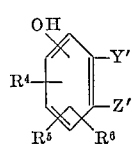

And, (c) a compound of the formula:

A—X'—B in which Z is a hydroxy group and Y is a hydrogen atom, a group —COCH$_3$ or a group —COOR' (in which R' is an alkyl group), or Y and Z together form a chain

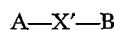

or a chain

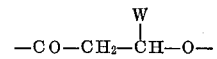

(in which W is a carboxylic acid group or a functional derivative thereof or a group convertible to a carboxylic acid group or a functional derivative thereof), Y' and Z' have the same definition as Y and Z above and may be the same or different; and A and B are the same or different and each is a group capable of reacting with a hydroxyl group to form an ether linkage, or one of A and B is a group capable of being converted to such a reactive group; and X' is such that the group —A'X'—B'— (in which A' and B' are the residues of A and B after the formation of ether linkages) has the same meaning as X; to form a compound of the formula:

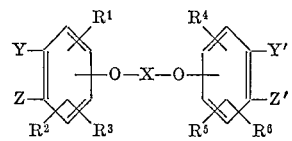

and, if necessary, intermediately or subsequently converting Y and Z and/or Y' and Z' to chains of the formula —CO—CH=C(COOH)—O—, or functional derivatives thereof.

As stated above, the process according to the invention may be carried out in one or more stages. Thus, it may be carried out in two stages as follows:

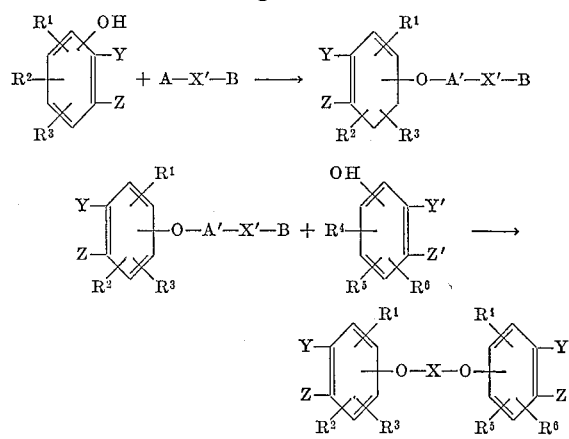

This procedure will generally be adopted when the two chromone moieties of the desired bis-chromonyl compound are different, i.e. when $R^1$, $R^2$ and $R^3$ are different from $R^4$, $R^5$ and $R^6$. In the two stage process, the groupings Y and Z or Y' and Z' may be modified at an intermediate stage but, in general, it is not preferred to follow this route. When the two chromone moieties of the desired bis-chromonyl compound are the same the reaction may be carried out in two stages, or preferably, if Y' and Z' have the same meanings and Y and Z, in one stage, i.e. by reaction of a compound of the formula:

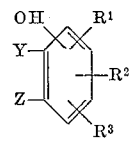

with a compound of the formula:

A—X'—B

When the reaction is carried out in two stages the compound A—X'—B may be such that one of A and B is a group capable of being converted to an ether linkage forming group. When both A and B are ether linkage forming groups, the first stage of a two stage reaction will, of course, be carried out using substantially equimolecular proportions of the two compounds.

Examples of groups A and B capable of reacting with a phenolic hydroxyl group, such that an ether linkage is formed by X' and the hydroxyl group, include halogen atoms, e.g. chlorine, bromine or iodine atoms, or other anion forming groups such as tosylate or methane sulphonate groups. Where the group A contains a hydroxy group beta to the subsequently formed ether linkage the group A or B may represent an epoxide group, giving rise to a residue A' or B' of —CH$_2$—CHOH—. The groups A and B may be the same or different; thus a compound A—X'—B capable of yielding a 2-hydroxy-trimethylene linkage is the compound:

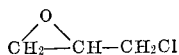

Groups capable of being converted to reactive groups such that an ether linkage may be subsequently formed include hydroxyl groups which may be converted to halogen substituents or other anion forming groups such as tosylate or methane sulphonate. The group A or B may alternatively be a vinyl group (—CH=CH$_2$) which may subsequently be converted to an epoxide or halohydrin group. Thus, an example of a compound A—X'—B which may be used to produce a 2-hydroxy-trimethylene linkage is allyl bromide.

The reaction between the chromone moiety or precursor therefore and the linking compound A—X'—B will be carried out under the conditions normally employed for the formation of ether linkages. Thus, the reaction will generally be carried out in the presence of aqueous alkali or a solvent such as acetone or dioxan and at elevated temperature. Where ether linkage formation is carried out by reaction of the aromatic hydroxy group and a compound A—X'—B in which A and/or B is an anion forming group (e.g. halogen, methanesulphonate etc.) the reaction is desirably carried out in the presence of an acid binding agent such as an alkali metal carbonate (e.g. sodium carbonate or potassium carbonate) or an organic acid binding agent such as pyridine, diethylaniline or triethylamine. Where A and/or B is an epoxide group the ether forming reaction may be conveniently carried out in the presence of a suitable catalyst, e.g. in the presence of a quaternary ammonium hydroxide.

The conversion, if necessary, of Y and Z and/or Y' and Z' to the desired chain

—CO—CH=C(COOH)—O— or functional derivative thereof will be carried out simultaneously if Y and Z are the same as Y' and Z' and in separate stages if Y and Z are not the same as Y' and Z'. It is, however, generally preferred that Y and Z are the same as Y' and Z' since this reduces the number of chemical stages involved.

In the following description of methods of converting Y and Z to the desired chain

—CO—CH=C(COOH)—O— or functional derivatives thereof reference will only be made to one chromone moiety but it will, of course, be understood that where Y and Z are the same as Y' and Z' the process will act simultaneously on both moieties.

A preferred process involves the conversion of the compound in which Y is a group —CO—CH$_3$ and Z is a hydroxy group (i.e. a substituted o-hydroxyacetophenone) to a chain —CO—CH=C(COOR)—O— (in which R is a hydrogen atom or an alkyl group); i.e.

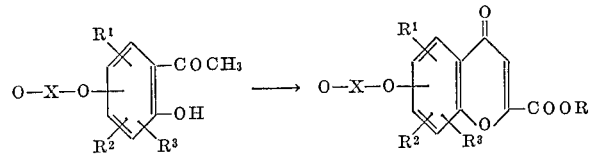

This reaction may be carried out by a number of routes. A preferred route involves the reaction of the o-hydroxy-acetophenone with an oxalic acid derivative of the formula:

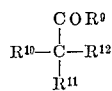

in which R$^9$ is a halogen atom or a group —OR' (in which R' is an alkyl group), R$^{10}$ and R$^{11}$ are both halogen atoms and R$^{12}$ is a group OR' or R$^{10}$ and R$^{11}$ together represent an oxygen atom (=O) and R$^{12}$ is a halogen atom or a group OR'.

Thus a particularly preferred process involves reaction of the ortho-hydroxy-acetophenone with a dialkyl oxalate, such as diethyl oxalate, preferably in the presence of a condensation agent such as an alkali metal alkoxide, e.g. sodium ethoxide, sodamide, metallic sodium or sodium hydride and conveniently in the presence of an organic solvent such as ether, dioxan, ethanol or benzene. This process goes through an intermediate of the formula:

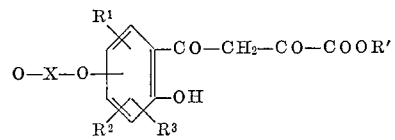

where R' is the alkyl group of the dialkyl oxalate, which intermediate may be cyclised directly by heating or may be isolated and cyclised by heating in a suitable solvent in the presence of a cyclisation agent such as an acid.

When the oxalic acid derivative is of the formula:

R'—O—C(Hal)$_2$—COOR"

in which R" is an alkyl group, e.g. ethyl ethoxydichloroacetate, the reactants are desirably employed in substantially equimolecular proportions and the reaction is conveniently carried out in the presence of a metallic catalyst such as finely divided metallic platinum, palladium or ruthenium. When the oxalic acid derivative is of the formula:

Hal—CO—COOR' e.g. ethyl oxalyl chloride, the reaction is conveniently carried out in the presence of an acid binding agent. When the oxalate derivative is an oxalyl halide such as oxalyl chloride, the reaction is suitably carried out in the presence of an organic solvent and in the presence of an acid binding agent.

The o-hydroxy-acetophenone may also be condensed with an ester of glyoxalic acid to give a compound of the formula:

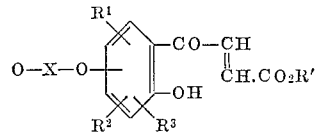

which may then be oxidatively cyclised to the desired chromone-2-carboxylic acid. Non-oxidative cyclisation gives rise to the corresponding chromanone which may be converted to the chromone as described below.

A different route for the formation of the desired chromonyl compound involves the conversion of Y and Z (when Y is —COCH$_3$ and Z is —OH) to an intermediate of the formula:

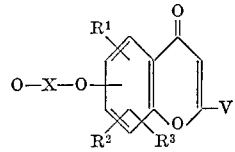

in which V is a group convertible to a carboxylic acid, or functional derivative thereof, and subsequent conversion of the group V to a carboxylic acid group or functional derivative thereof.

Examples of the group V are the nitrile group which may be hydrolysed to a carboxylic acid group and groups such as methyl, hydroxymethyl, halomethyl (e.g. chloromethyl, bromomethyl, dichloromethyl, trichloromethyl), formyl, acetyl, vinyl and styryl groups, oxidisable or hydroylsable to a carboxylic acid group.

The 2-methyl chromone may be prepared from the o-hydroxy-acetophenone by condensation with an alkyl acetate, in a similar manner to the condensation described above for the dialkyl oxalate.

The 2-methyl chromone also serves as an intermediate in the preparation of a number of other oxidisable derivatives. Thus, the 2-methyl chromone may be converted into the corresponding 2-halomethyl-chromone, e.g. by reaction with hydrogen chloride and manganese dioxide in boiling acetic acid to produce a 2-chloromethyl chromone or by reaction with bromine in acetic acid to yield the 2-bromomethylchromone. The 2-halomethyl chromone may be oxidised to the corresponding chromone-2-carboxylic acid, for example, with potassium permanganate, or may be hydrolysed, using, for example, moist silver oxide, to give the 2-hydroxymethyl chromone which may then be oxidised to the chromone-2-carboxylic acid, for example, using chromium trioxide as oxidising agent in the presence of acetic acid and at ambient temperature or below.

The 2-methyl chromone may further be reacted with p-nitrosodimethylaniline and the reaction product hydrolysed with dilute mineral acid to give the corresponding 2-formyl-chromone which may be oxidised to the corresponding chromone-2-carboxylic acid using, for example, chromium trioxide as reagent.

Condensation of 2-methyl-chromone with a benzaldehyde in the presence of a condensation catalyst gives the 2-styryl chromone which may be oxidised to the corresponding chromone-2-carboxylic acid, for example, using potassium permaganate.

A number of the chromone derivatives, other than the 2-methyl chromone, convertible to the chromone-2-carboxylic acid may be prepared directly from the o-hydroxyacetophenone.

Thus, the 2-formyl chromone may be prepared by condensation of a dialkoxy acetate of the formula:

$$(R'O)_2 \cdot CH - COOR''$$

in which R' and R'' have the meanings defined above, e.g. ethyl diethoxy acetate, with the o-hydroxy-acetophenone to yield an acetal which may subsequently be hydrolysed, e.g. with dilute mineral acid, to the aldehyde, which may subsequently be oxidised to the carboxylic acid.

The 2-formyl chromone may also serve as a starting point for the preparation of the 2-cyano chromone. Thus, the 2-formyl chromone may be reacted with hydroxylamine to yield the 2-oximine-chromone which may then be dehydrated to the 2-cyano-chromone which may then be hydrolysed to the chromone-2-carboxylic acid or amide thereof under acid conditions.

The 2-styryl chromone may be prepared from the o-hydroxy-acetophenone by reaction with sodium cinnamate and cinnamic anhydride (i.e. by the Kestanecki reaction) or by reaction with a cinnamoyl halide, e.g. cinnamoyl chloride, in the presence of an acid binding agent to yield the cinnamate ester of the o-hydroxyacetophenone followed by treatment with a base, e.g. potassium carbonate, in the presence of an inert solvent such as toluene or benzene to give an alpha-diketone of the formula:

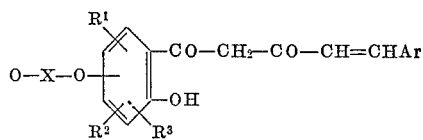

which is subsequently cyclised either by direct heating or by heating in the presence of a cyclisation agent (Baker Venkataraman reaction).

The 2-vinyl chromone may likewise be prepared from the o-hydroxy-acetophenone by reaction with ethyl acrylate.

The compound in which Y is a hydrogen atom and Z is a hydroxyl group, i.e. the phenol of the formula:

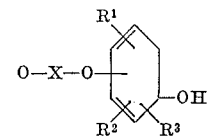

may be converted to the corresponding chromone-2-carboxylic acid by a number of methods.

For example, the chromone-2-carboxylic acid may be prepared by reaction of acetylene dicarboxylic acid or a dialkyl ester thereof, e.g. diethyl acetylene dicarboxylate, with the phenol or with an alkali metal phenate thereof.

Where the acetylene dicarboxylic acid or ester thereof is reacted with the alkali metal phenate, i.e. the compound of the formula:

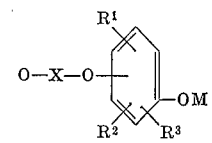

in which M is an alkali metal atom, the reaction is desirably carried out in the presence of an inert organic solvent or diluent to yield a fumarate of the formula:

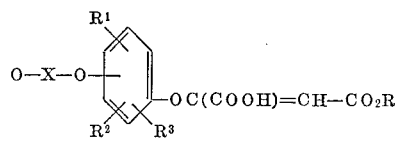

which is then, if necessary after hydrolysis, cyclised to the desired chromone-2-carboxylic acid, for example by treating with a cyclisation catalyst such as sulphuric acid. In a modification of this process the acetylene dicarboxylic acid or ester thereof is replaced by a halofumaric acid or an ester thereof, e.g. diethyl chlorofumarate, or by a dihalosuccinic acid or ester thereof.

The chromone-2-carboxylic acid may also be prepared from the phenol by reaction with a compound such as ethyl ethoxalylacetate.

In another method the phenol may be esterified, e.g. with ethyl ethoxalyl chloride to give an ester of the formula:

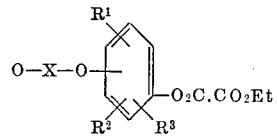

which may subsequently be cyclised in the presence of acetic acid or a derivative thereof (e.g. ethyl acetate or acetyl chloride) to give the desired chromone-2-carboxylic acid.

The phenol may alternatively be condensed with maleic anhydride to give a compound of the formula:

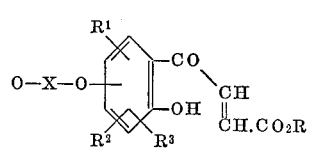

which may then be oxidatively cyclised to the desired chromone-2-carboxylic acid. Non-oxidative cyclisation gives rise to the corresponding chromanone which may then be converted to the chromone as described below.

The compound in which Z is a hydroxyl group and

Y is a group —COOR′ i.e. the substituted salicylic acid ester of the formula:

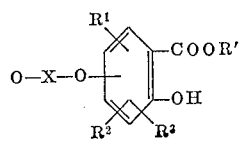

may be converted to the desired chromone-2-carboxylic acid by reaction with a pyruvate ester of the formula:

$$CH_3-CO-COOR'$$

if desired in the presence of a condensation agent such as an alkali metal alkoxide (e.g. sodium ethoxide), sodamide, metallic sodium or sodium hydride, and preferably in the presence of an organic solvent such as ethanol or dioxan.

When Y and Z together form a chain

in which W is the desired carboxylic acid group or functional derivative thereof, obviously no modification of Y and Z will be necessary. When W is group convertible to a carboxylic acid group, or a functional derivative thereof, it will have the same meaning as defined for V above and may be converted to the corresponding carboxylic acid group as described for V above.

When Y and Z together form a chain

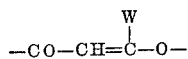

i.e. a chromanone, the group W will remain unchanged or be converted to a carboxylic acid group as necessary and further the chromanone will need to be dehydrogenated to the corresponding chromone; which dehydrogenation may be carried out either before or after any conversion of W.

The dehydrogenation of the chromanone of the formula:

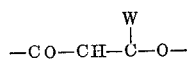

may, for example, be effected using selenium dioxide or other suitable dehydrogenating agents such as palladium black or chloranil.

Alternatively, dehydrogenation may be carried out by bromination followed by dehydrobromination. Thus, the chromanone may be brominated using N-bromosuccinimide in an inert solvent or by treatment with pyridinium perbromide in an inert solvent such as chloroform in the presence of a free radical catalyst such as benzoyl peroxide, to yield the 3-bromo derivative which may be subsequently dehydrobrominated.

The processes described above generally lead to the formation of the chromone-2-carboxylic acids as such or in the form of their esters. These may be readily converted to other functional derivatives, e.g. salts or amides, by conventional methods.

The majority of the intermediates produced by the linking of the two chromone moieties or precursors therefore are in themselves new.

According to the invention, therefore, there are provided as new compounds, compounds of the formula:

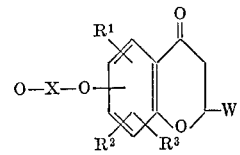

in which $R^1$, $R^2$, $R^3$, $R^4$, $R^5$, $R^6$, X, Y, Z, Y′ and Z′ have the meanings defined above, provided that not more than one of Y and Z and Y′ and Z′ represents a chain —CO—CH=C(COOH)—O— or a functional derivative thereof.

This invention also provides a process for the preparation of the new intermediates which comprises reacting in one or more stages:

(a) A compound of the formula:

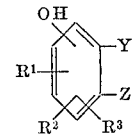

(b) A compound of the formula:

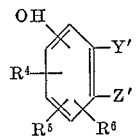

And (c) a compound of the formula:

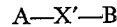

in which A and B have the meanings defined above.

In order that the invention may be well understood, the following examples are given by way of illustration only.

EXAMPLE 1

(a) 1,3 - bis(2-acetyl-3-hydroxy-5-methoxyphenoxy)propan-2-ol

A mixture of 9.1 parts of 2,6 - dihydroxy-4-methoxyacetophenone and 2.33 parts of epichlorohydrin was added to a stirred solution of sodium ethoxide in ethanol, prepared from 0.58 part of sodium and 30 parts of ethanol. The mixture was heated under reflux, with stirring, for 4½ hours.

The mixture was then poured into 250 parts of cold water and a gummy grey solid separated out. The supernatant liquid was decanted and the solid was crystallised from ethanol to give 5.35 parts of 1,3-bis(2-acetyl-3-hydroxy - 5 - methoxyphenoxy)propan-2-ol as colourless needles, melting point 180-2° C.

*Analysis.*—$C_{21}H_{24}O_9$ requires (percent): C, 59.99; H, 5.75. Found (percent): C, 60.0; H, 5.80.

(b) 1,3-bis(2-carboxy-7-methoxychromon-5-yloxy) propan-2-ol

To a stirred solution of sodium ethoxide in ethanol, prepared from 0.92 part of sodium and 20 parts of ethanol, was added a mixture of 2.1 parts of 1,3-bis(2-acetyl-3-hydroxy-5-methoxyphenoxy)propan-2-ol and 3.7 parts of diethyl oxalate in 30 parts of dioxan, followed by 20 parts of ethanol. The mixture was heated under reflux, with stirring, for 4 hours.

Diethyl ether and water were then added and the aqueous layer was separated and acidified with dilute hydrochloric acid. The aqueous layer was then extracted with chloroform and after drying over sodium sulphate the chloroform was evaporated off to leave a brown oil.

This oil was dissolved in boiling ethanol and on the addition of 0.5 part of concentrated hydrochloric acid 2.3 parts of a brown solid immediately separated out.

This solid was dissolved in a hot, stirred, aqueous solution of sodium bicarbonate. The hot solution was then treated with charcoal, filtered and acidified with concentrated hydrochloric acid, whilst stirring vigorously, to give 1.73 parts of 1,3-bis(2-carboxy-7-methoxychromon-5-yloxy)propan-2-ol as a pale yellow solid, melting point 245° C. (decomp.)

*Analysis.*—$C_{25}H_{20}O_{13}$ requires (percent): C, 56.82; H, 3.79. Found (percent): C, 56.6; H, 4.14.

(c) 1,3-bis(2-carboxy-7-methoxychromon-5-yloxy) propan-2-ol, disodium salt

A solution of 1.06 parts of 1,3-bis(2-carboxy-7-methoxychromon-5-yloxy)propan-2-ol and 0.34 part of sodium bicarbonate in 50 parts of water was freeze-dried to give 1.06 parts of 1,3-bis(2-carboxy-7-methoxychromon-5-yloxy)propan-2-ol, disodium salt as a white solid.

EXAMPLE 2

(a) 1,5-bis(2-acetyl-3-hydroxy-5-methoxyphenoxy(pentane

A mixture of 7.8 parts of 2,6-dihydroxy-4-methoxyacetophenone, 5 parts of 1,5-dibromopentane, 10 parts of anhydrous potassium carbonate and 0.5 part of potassium iodide in 150 parts of dry acetone was heated under reflux for 4 days.

The solid was filtered off, and washed well with water. The residue was crystallised from aqueous dioxan to give 6.0 parts of 1,5-bis(2-acetyl-3-hydroxy-5-methoxyphenoxy)pentane as colourless prisms, melting point 146–7° C.

Analysis.—$C_{23}H_{28}O_8$ requires (percent): C, 63.88; H, 6.53. Found (percent): C, 64.1; H, 6.56.

(b) 1,5-bis(2-carboxy-7-methoxychromon-5-yloxy) pentane, monohydrate

By the method of Example 1(b) 2.16 parts of 1,5-bis(2-acetyl-3-hydroxy-5-methoxyphenoxy)pentane were reacted with diethyl oxalate to give 2.05 parts of 1,5-bis(2-carboxy-7-methoxychromon-5-yloxy)pentane, monohydrate as a cream-coloured solid melting point 238° C.

Analysis.—$C_{27}H_{24}O_{12}H_2O$ requires (percent): C, 58.06; H, 4.66. Found (percent): C, 58.2; H, 4.70.

(c) 1,5-bis(2-carboxy-7-methoxychromon-5-yloxy) pentane, disodium salt

By the method of Example 1(c) 1.1 parts of 1,5-bis(2-carboxy-7-methoxychromon-5-yloxy)pentane, monohydrate were treated with sodium bicarbonate to give 1.1 parts of 1,5-bis(2-carboxy-7-methoxychromon-5-yloxy) pentane disodium salt as a buff coloured solid.

EXAMPLE 3

(a) 1,3-bis(2,4-diacetyl-3,5-dihydroxyphenoxy) propan-2-ol, monohydrate

A solution of 1.8 parts of potassium hydroxide in 25 parts of isopropanol, and as little water as is necessary to complete solution, was added to a stirred, hot solution of 10.5 parts of 2,4-diacetylphloroglucinol and 2.5 parts of epichlorohydrin in 25 parts of isopropanol.

The mixture was stirred and heated under reflux for 2 days by which time a white precipitate had settled out. The mixture was then cooled and water was added. The remaining solid was filtered off and crystallised from dioxan to give 5.0 parts of 1,3-bis(2,4-diacetyl-3,5-dihydroxyphenoxy)propan-2-ol, monohydrate as colourless needles, melting point 244–5° C.

Analysis.—$C_{23}H_{24}O_{11}H_2O$ requires (percent): C, 55.87; H, 5.26. Found (percent): C, 55.8; H, 5.02.

(b) 1,3-bis(4-acetyl-3,5-dihydroxyphenoxy) propan-2-ol

A solution of 11.1 parts of 1,3-bis(2,4-diacetyl-3,5-dihydroxyphenoxy)propan-2-ol, monohydrate and 5.05 parts of sodium hydroxide in 175 parts of water was heated under reflux for 1 hour. The solution was cooled, then acidified with concentrated hydrochloric acid to give a brown gummy solid.

This solid was crystallised from aqueous ethanol to give 4.1 parts of 1,3-bis(4-acetyl-3,5-dihydroxyphenoxy) propan-2-ol as colourless needles, melting point 251–3° C.

Analysis.—$C_{19}H_{20}O_9$ requires (percent): C, 58.2; H, 5.14. Found (percent): C, 59.0; H, 5.24.

(c) 1,3-bis(4-acetyl-3-hydroxy-5-(2-hydroxypropoxy)phenoxy)propan-2-ol

A mixture of 7.9 parts of 1,3-bis(4-acetyl-3,5-dihydroxyphenoxy)propan-2-ol, 3.5 parts of propylene oxide and 0.5 part of benzyl trimethyl ammonium hydroxide in 20 parts of dioxan was heated in a sealed vessel at 100° C. for 4 days. The dioxan was then removed under reduced pressure and the residue wos dissolved in ethanol.

On dilution with water an oil was precipitated which solidified on scratching. This solid was crystallised from ethyl acetate to give 2.4 parts of 1,3-bis(4-acetyl-3-hydroxy-5-(2-hydroxypropoxy)phenoxy)propan-2-ol as colourless needles, melting point 148–50° C.

This product which was shown by thin layer chromatography to be homogeneous was used directly in the next stage of the synthesis.

(d) 1,3-bis(2-carboxy-5-(2-hydroxypropoxy) chromon-7-yloxy)propan-2-ol, monohydrate By the method of Example 1(b) 2.0 parts of 1,3-bis(4-acetyl - 3 - hydroxy-5 - (2 - hydroxypropoxy)phenoxy) propan-2-ol were reacted with diethyl oxalate to give 0.78 part of 1,3-bis(2-carboxy-5-(2-hydroxypropoxy)chromon-7-yloxy)propan-2-ol, monohydrate as buff-coloured microneedles melting point 160–1° C. (decomp.) from ethanol.

Analysis.—$C_{29}H_{28}O_{15}H_2O$ requires (percent): C, 54.9; H, 4.73. Found (percent): C, 54.5; H, 5.02.

(e) 1,3-bis(2-carboxy-5-(2-hydroxypropoxy)chromon-7-yloxy)propan-2-ol, disodium salt By the method of Example 1(c) 0.7 part of 1,3-bis(2-carboxy - 5 - (2-hydroxpropoxy)chromon-7-yloxy)propan-2-ol, monohydrate were treated with sodium bicarbonate to give 0.7 part of 1,3-bis(2-carboxy-5-(2-hydroxypropoxy)chromon-7-yloxy)propan-2-ol, disodium salt as a white solid.

EXAMPLE 4

(a) 2,4-diacetyl-5-(2-hydroxypropoxy)resorcinol

A mixture of 10 parts of 2,4-diacetylphloroglucinol 3.33 parts of propylene oxide and 0.5 part of benzyltrimethylammonium hydroxide in 20 parts of dioxan was heated in a sealed vessel at 100° C. for 2 days.

The resulting orange solution was poured into 200 parts of water and a white solid was precipitated. This solid was crystallised from ethanol to give 8.1 parts of 2,4-diacetyl - 5 - (2-hydroxypropoxy)resorcinol as colourless needles, melting point 152–4° C.

Analysis.—$C_{13}H_{16}O_6$ requires (percent): C, 58,2; H, 6.01. Found (percent): C, 58.0; H, 5.92.

(b) 2,6-dihydroxy-4-(2-hydroxypropoxy)acetophenone

A solution of 8.0 parts of 2,4-diacetyl-5-(2-hydroxypropoxy) resorcinol and 4.8 parts of sodium hydroxide in 120 parts of water was heated under reflux for 1 hour.

The cooled solution was then acidified with concentrated hydrochloric acid to give a buff coloured precipitate. This solid was crystallised from aqueous ethanol to give 2.17 parts of 2,6-dihydroxy-4-(2-hydroxypropoxy)acetophenone as buff coloured needles, melting point 177–8° C.

Analysis.—$C_{11}H_{14}O_5$ requires (percent): C, 58.4; H, 6.24. Found (percent): C, 58.4; H, 6.34.

(c) 1,3-bis(2-acetyl-3-hydroxy-5-(2-hydroxypropoxy) phenoxy)propan-2-ol

By the method of Example 3(a) 14.5 parts of 2,6-dihydroxy - 4 - (2 - hydroxypropoxy) acetophenone were treated with epichlorohydrin to give 6.9 parts of 1,3-bis(2-acetyl - 3 - hydroxy - 5 - (2 - hydroxypropoxy)phenoxy) propan-2-ol as colourless needles, melting point 201–3° C. from ethanol.

*Analysis.*—$C_{25}H_{32}O_{11}$ requires (percent): C, 59.05; H, 6.34. Found (percent): C, 58.4; H, 6.5.

(d) 1,3-bis(2-carboxy-7-(2-hydroxypropoxy)chromon-5-yloxy)propan-2-ol

By the method of Example 1(b) 2.54 parts of 1,3-bis(2-acetyl - 3 - hydroxy - 5 - (2 - hydroxypropoxy)phenoxy) propan-2-ol were reacted with diethyl oxalate to give 0.085 part of 1,3-bis(2-carboxy-7-(2-hydroxypropoxy)chromon-5-yloxy)propan-2-ol as a colourless solid, melting point 244–6° C.

*Analysis.*—$C_{29}H_{28}O_{15}$ requires (percent): C, 56.5; H, 4.54. Found (percent): C, 56.2; H, 4.72.

(e) 1,3-bis(2-carboxy-7-(2-hydroxypropoxy)chromon-5-yloxy)propan-2-ol, disodium salt By the method of Example 1(c) 0.08 part of 1,3-bis(2-carboxy - 7 - (2 - hydroxypropoxy)chromon - 5 - yloxy) propan-2-ol were treated with sodium bicarbonate to give 0.08 part of 1,3-bis(2-carboxy - 7 - (2 - hydroxypropoxy) chromon-5-yloxy)propan-2-ol disodium salt as a white solid.

EXAMPLE 5

(a) (i) 1,5-bis(4-acetyl-3-hydroxy-5-methoxyphenoxy) pentane

By the method of Example 2(a) 6.05 parts of 2,4-dihydroxy-6-methoxyacetophenone were treated with 1,5-dibromopentane to give 4.05 parts of 1,5-bis(4-acetyl-3-hydroxy-5-methoxyphenoxy)pentane as colourless needles, melting point 130–2° C. from ethanol.

*Analysis.*—$C_{23}H_{28}O_8$ requires (percent): C, 63.88; H, 6.50. Found (percent): C, 63.4; H, 6.39.

(a) (ii) Alternative route to 1,5-bis(4-acetyl-3-hydroxy-5-methoxyphenoxy)pentane 1,5 - bis(5 - hydroxy - 2 - methylchromon - 7 - yloxy) pentane.—By the method of Example 2(a) 27 parts of 5,7-dihydroxy-2-methylchromone were treated with 1,5-dibromopentane to give 22.25 parts of 1,5-bis(5-hydroxy-2-methylchromon - 7 - yloxy)pentane as a buff coloured solid, melting point 185° C. from acetic acid.

*Analysis.*—$C_{25}H_{24}O_8$ requires (percent): C, 66.36; H, 5.35. Found (percent): C, 66.2; H, 5.28.

1,5 - bis(5 - methoxy - 2 - methylchromon - 7 - yloxy) pentane.—A mixture of 5.0 parts of 1,5-bis(5-hydroxy-2-methylchromon-7-yloxy)pentane, 2.8 parts of dimethyl sulphate and 2.9 parts of anhydrous potassium carbonate in 100 parts of dry acetone was refluxed for 16 hours. The solid was filtered off and washed with hot acetone, water and finally with acetone.

The remaining solid was crystallised from aqueous acetic acid to give 2.5 parts of 1,5-bis(5-methoxy-2-methylchromon-7-yloxy)pentane, melting point 208–9° C.

*Analysis.*—$C_{27}H_{28}O_8$ requires (percent): C, 67.49; H, 5.87. Found (percent): C, 67.4; H, 5.76.

1,5 - bis(4 - acetyl - 3 - hydroxy - 5 - methoxyphenoxy) pentane.—A solution of 4.0 parts of 1,5-bis(5-methoxy-2-methylchromon-7-yloxy)pentane and 2.0 parts of potassium hydroxide in 20 parts of water and 20 parts of ethanol was refluxed for 1 hour. The solution was then diluted with water and acidified with concentrated hydrochloric acid to give a brown precipitate.

This solid was crystallised from ethanol to give 1.0 parts of 1,5-bis(4 - acetyl-3-hydroxy-5-methoxyphenoxy) pentane, melting point 130–2° C. This material was identical to that produced directly from 2,4-dihydroxy-6-methoxy-acetophenone by the route given above.

(b) 1,5-bis(2-carboxy-5-methoxychromon-7-yloxy) pentane trihydrate

By the method of Example 1(b) 2.16 parts of 1,5-bis (4 - acetyl - 3-hydroxy-5-methoxyphenoxy)pentane were reacted with diethyl oxalate to give 1.45 parts of 1,5-bis (2 - carboxy-5-methoxychromon-7-yloxy)pentane, trihydrate as pale yellow needles melting point 159–70° C. (indefinite) from ethanol-dioxan.

*Analysis.*—$C_{27}H_{24}O_{12}3H_2O$ requires (percent): C, 54.5; H, 5.06. Found (percent): C, 54.6; H, 4.9.

(c) 1,5-bis(2-carboxy-5-methoxychromon-7-yloxy) pentane, disodium salt

By the method of Example 1(c) 1.03 parts of 1,5-bis (2 - carboxy-5-methoxychromon-7-yloxy)pentane, trihydrate were treated with sodium bicarbonate to give 1.0 part of 1,5 - bis(2-carboxy-5-methoxychromon-7-yloxy) pentane, disodium salt as a white solid.

EXAMPLE 6

(a) 1,5-bis(5-acetyl-4-hydroxy-2-methoxyphenoxy) pentane

By the method of Example 2(a) 7.3 parts of 2,5-dihydroxy - 4-methoxyacetophenone were treated with 1,5-dibromopentane to give 5.15 parts of 1,5-bis(5-acetyl-4-hydroxy-2-methoxyphenoxy)pentane, melting point 145–8° C.

*Analysis.*—$C_{23}H_{78}O_8$ requires (percent): C, 63.88; H, 6.53. Found (percent): C, 63.9; H, 6.56.

(b) 1,5-bis(2-carboxy-7-methoxychromon-6-yloxy) pentane dihydrate

By the method of Example 1(b) 2.5 parts of 1,5-bis(5-acetyl - 4 - hydroxy - 2-methoxyphenoxy)pentane were reacted with diethyl oxalate to give 1.25 parts of 1,5-bis (2 - carboxy-7-methoxychromon-6-yloxy)pentane which crystallised from dioxan as the dihydrate, melting point 258–60° C.

*Analysis.*—$C_{27}H_{24}O_{12}2H_2O$ requires (percent): C, 56.25; H, 4.86. Found (percent): C, 56.0; H, 5.10.

(c) 1,5-bis(2-carboxy-7-methoxychromon-6-yloxy) pentane disodium salt

By the method of Example 1(c) 0.76 part of 1,5-bis (2 - carboxy - 7-methoxychromon-6-yloxy)pentane dihydrate were reacted with sodium bicarbonate to give 0.6 part of 1,5 - bis(2-carboxy-7-methoxychromon-6-yloxy) pentane disodium salt.

EXAMPLE 7

(a) 2,5-dihydroxy-4-(2-hydroxypropoxy)acetophenone 8.4 parts of 2 - hydroxy-4-(2-hydroxypropoxy) acetophenone were dissolved in a solution of 12.0 parts of potassium hydroxide in 100 parts of water. This solution was stirred and maintained at a temperature between 15 and 20° C. during the slow addition of a solution of 12.0 parts of potassium persulphate in 250 parts of water. After 4½ hours the addition was completed and the mixture was then allowed to stand at room temperature for 18 hours.

The reaction mixture was acidified to pH 3 with concentrated hydrochloric acid and the unreacted 2-hydroxy-4 - (2-hydroxypropoxy)acetophenone which precipitated was removed by filtration. The aqueous solution was washed twice with ethyl acetate and was then heated on a steam bath for 1 hour with 80 parts of concentrated hydrochloric acid.

The aqueous solution was cooled and the brown solid which crystallised out was filtered off and dried in the oven. Extraction of the filtrate with ethyl acetate afforded a further quantity of the same material. The crude product was recrystallised from ethanol to give 2.21 parts of 2,5 - dihydroxy-4-(2-hydroxypropoxy)acetophenone as a light brown solid, melting point 186–8° C.

*Analysis.*—$C_{11}H_{14}O_5$ requires (percent): C, 58.4; H, 6.24. Found (percent): C, 58.8; H, 6.26.

(b) 1,5-bis(5-acetyl-4-hydroxy-2-(2-hydroxypropoxy) phenoxy)pentane monohydrate By the method of Example 2(a) 7.0 parts of 2,5-dihydroxy - 4-(2-hydroxypropoxy)acetophenone were reacted with 1,5-dibromopentane to give 2.17 parts of 1,5-bis(5-acetyl - 4 - hydroxy-2-(2-hydroxypropoxy)phenoxy)pentane which crystallised from ethanol as the monohydrate, melting point 122° C.

*Analysis.*—$C_{27}H_{36}O_{10}H_2O$ requires (percent): C, 60.2; H, 7.05. Found (percent): C, 60.6; H, 7.07.

(c) 1,5-bis(2-ethoxycarbonyl-7-(2-hydroxypropoxy) chromon-6-yloxy)pentane

To a stirred solution of sodium ethoxide in ethanol, prepared from 0.735 part of sodium in 10.0 parts of ethanol, was added a slurry of 2.17 parts of 1,5-bis(5-acetyl - 4 - hydroxy-2(2-hydroxypropoxy)phenoxy)pentane monohydrate and 2.92 parts of diethyl oxalate in 15.0 parts of dioxan and 5.0 parts of ethanol. 15.0 parts of diethyl ether were added and the mixture was heated under reflux, with stirring, for 5 hours.

Diethyl ether and water were then added and the aqueous layer was separated and acidified with dilute hydrochloric acid. The acidified solution was extracted with chloroform. The chloroform extract was dried over anhydrous sodium sulphate, filtered and the solvent was evaporated to leave a red oil. The oil was dissolved in ethanol and the solution was heated under reflux with 0.5 part of concentrated hydrochloric acid for 15 minutes. On cooling 1.95 parts of yellow solid crystallised. This material was recrystallised from dioxan to give 1,5-bis(2-ethoxycarbonyl - 7-(2-hydroxypropoxy)chromon-6-yloxy) pentane as a yellow solid, melting point 180–3° C.

*Analysis.*—$C_{35}H_{40}O_{14}$ requires (percent): C, 61.39; H, 5.89. Found (percent): C, 62.0; H, 6.14.

(d) 1,5-bis(2-carboxy-7-(2-hydroxypropoxy)chromon-6-yloxy)pentane

A solution of 1.7 parts of 1,5-bis(2-ethoxycarbonyl-7-(2 - hydroxypropoxy)chromon-6-yloxy)pentane together with 4.0 parts of sodium bicarbonate in 50 parts of water was heated with stirring for 1½ hours. The resulting solution was treated with charcoal, filtered and acidified with dilute hydrochloric acid. The resulting suspension was heated on a steam bath for 20 minutes and the solid was filtered off, washed with water, and dried to give 1.3 parts of 1,5 - bis(2-carboxy-7-(2-hydroxypropoxy)chromon - 6-yloxy)pentane as a yellow solid, melting point 238–40° C.

*Analysis.*—$C_{31}H_{32}O_{14}$ requires (percent): C, 59.21; H, 5.13. Found (percent): C, 58.8; H, 5.28.

(e) 1,5-bis(2-carboxy-7-(2-hydroxypropoxy)chromon-6-yloxy)pentane disodium salt By the method of Example 1(c) 0.8 part of 1,5-bis-2-carboxy-7-(2-hydroxypropoxy)chromon-6-yloxy pentane were treated with sodium bicarbonate to give 0.8 part of 1,5 - bis(2-carboxy-7-(2-hydroxypropoxy)chromon - 6-yloxy) pentane disodium salt.

EXAMPLE 8

1,3-bis(2-carboxy-5-hydroxychromon-7-yloxy)propan-2-ol (a) 1,3 - bis(2 - carboxy - 5 - hydroxychromon-7-yloxy)propan-2-ol, monohydrate.—A solution of 0.95 part of 1,3 - bis(5-benzyloxy-2-carboxychromon-7-yloxy)propan-2-ol, monohydrate in 10 parts of 45% hydrogen bromide-acetic acid and 10 parts of glacial acetic acid was heated under reflux for 1 hour. The solution was then poured into 150 parts of ice-cold water to give a green precipitate which was dried and crystallised from ethanol to give 0.34 part of 1,3-bis(2-carboxy-5-hydroxychromon-7-yloxy)propan-2-ol, monohydrate, melting point 245–6° C.

*Analysis.*—$C_{23}H_{16}O_{13}H_2O$ requires (percent): C, 53.0; H, 3.46. Found (percent): C, 53.1; H, 3.3.

(b) 1,3 - bis(2 - carboxy-5-hydroxychromon-7-yloxy) propan-2-ol, disodium salt.—By the method of Example 1(c) 0.336 part of 1,3-bis(2-carboxy-5-hydroxychromon-7-yloxy)propan-2-ol, monohydrate were treated with sodium bicarbonate to give 0.31 part of 1,3-bis(2-carboxy-5-hydroxychromon-7-yloxy)propan-2-ol, disodium salt.

EXAMPLE 9

1,3-bis(8-allyl-2-ethoxycarbonylchromon-5-yloxy)propan-2-ol (a) 3-allyl-2,6-dihydroxyacetophenone.—31.4 parts of 6-allyl-oxy-2-hydroxyacetophenone was heated in a bath the temperature of which was raised gradually from 140° C. At 180° C. an exothermic reaction commenced and the bath temperature was maintained at 180–190° C. until this reaction was almost complete. Then the bath temperature was raised to 200° C. for 30 minutes. The resultant oil was purified by distillation and the 3-allyl-2,6-dihydrocyacetophenone (21.4 parts) which had B.P. 134–137° at 1 mm. solidified on cooling and had M.P. 66–68° C.

*Analysis.*—$C_{11}H_{12}O_3$ requires (percent): C, 68.8; H, 6.25. Found (percent): C, 69.2; H, 6.28.

(b) 1,3 - bis(1 - acetyl-3-allyl-2-hydroxyphenoxy)propan-2-ol.—To a solution of 3-allyl-2,6-dihydroxyacetophenone (5 parts) and epichlorohydrin (1.5 parts) in isopropanol (30 parts) was added a solution of potassium hydroxide 0.9 part in isopropanol (10 parts) (a little water was necessary for completing this latter solution). This mixture was refluxed for 2 days and then evaporated to dryness under reduced pressure. This residue was taken up in water and extracted with ether (3×50 parts). The ether extract after drying was evaporated to yield an oil which proved to be a multi-component mixture as shown by thin layer chromatography. It was found possible to purify this oil (4 parts) sufficiently for proceeding to the next stage by repeated extraction with hot petrol ether (B.P. 40–60°).

(c) 1,3-bis(8-allyl-2-ethoxycarbonylchromon-5-yloxy)propan-2-ol

A solution of 4 parts of the above crude oil and 10 parts of diethyl oxalate in 80 parts of dry ether was added to a solution of 2.3 parts of sodium in 100 parts of ethanol and 20 parts of dry ether. This mixture was stirred and refluxed for 4 hours and after pouring into excess ether was extracted with water (3×100 parts). The combined aqueous extract was acidified with concentrated hydrochloric acid and extracted into chloroform (3×50 parts). After drying ($Na_2SO_4$) the chloroform was removed by evaporation and the residual oil was taken up in ethanol (30 parts) to which a few drops of concentrated hydrochloric acid had been added. The solution was then refluxed for a few minutes and on cooling the product (1.6 parts) crystallised and had melting point 153–155° C. after recrystallising from ethanol.

*Analysis.*—$C_{33}H_{32}O_{11}$ requires (percent): C, 65.5; H, 5.3. Found (percent): C, 65.8; H, 5.37.

(d) 1,3 - bis(8 - allyl - 2 - carboxychromon - 5 - yloxy) propan-2-ol.—The above ester (0.75 part) was suspended in methanol (40 parts) and an exact equivalent of 0.93 N sodium hydroxide in methanol (2.7 parts) was added. This solution was refluxed for 30 minutes and then the methanol was removed under reduced pressure. The residual solid was taken up in water and acidified. The acid which precipitated was crystallised from ethanol and water, to yield 0.5 part melting between 214–218° (D) with preliminary loss of water.

*Analysis.*—$C_{29}H_{24}O_{11}2H_2O$ requires (percent): C, 59.6; H, 4.8. Found (percent): C, 60.2; H, 4.3.

This acid was dissolved in an equivalent amount of sodium bicarbonate solution and freeze-dried to obtain the disodium salt.

EXAMPLE 10

(a) 1,3-bis(4-acetyl-2-allyl-3-hydroxyphenoxy)propan-2-ol

To a solution of sodium ethoxide (from 0.3 parts of sodium and 50 parts of ethanol) was added a solution of 4.8 parts of 3-allyl-2, 4-dihydroxyacetophenone, 1.19 parts of epichlorohydrin and 10 parts of ethanol. This mixture was refluxed and stirred for 2 hours and then the solution was evaporated to dryness. Water was added to the residue and the oil was extracted into ether. The ether extract was washed with sodium carbonate solution, water and then dried over $Na_2SO_4$. After removing the drying agent the ether was removed by evaporation and then the residue which contained some starting material (shown by T.L.C.) was purified by extraction with hot petroleum ether (B.P. 60–80°) to remove most of the impurity, and crystallisation from benzene petroleum ether (B.P. 60–80°). Thus 1 part of 1,3-bis(4-acetyl-2-allyl-3-hydroxyphenoxy)propan-2-ol was obtained melting between 137 and 139° C.

*Analysis.*—$C_{25}H_{28}O_7$ requires (percent): C, 68.2; H, 6.4. Found (percent): C, 67.4; H, 6.4.

(b) 1,3-bis(8-allyl-2-carboxychromon-7-yloxy)propan-2-ol

A solution of 5.9 parts of 1,3-bis(4-acetyl-2-allyl-3-hydroxyphenoxy)propan-2-ol and 10 parts of diethyl oxalate in 100 parts of anhydrous ether was added to a solution of 5 parts of sodium in 90 parts of ethanol. This mixture was stirred at room temperature overnight and then refluxed for 1 hour with stirring. After pouring into ether the solution was extracted with water and the aqueous extract was then acidified (hydrochloric acid) and extracted into chloroform. The oily material at this stage was not easily soluble in chloroform and some which did not dissolve was combined with the extract which was then evaporated to dryness. The residue was then taken up in ethanol (30 parts) plus 6 drops of concentrated hydrochloric acid and this solution was boiled for 30 minutes. The product (3 parts) which separated on cooling as yellow crystals appeared to be a mixture of acid and ester, therefore, it was hydrolysed by adding an approximate equivalent of normal sodium hydroxide in methanol and heating for 10 minutes. This solution was then evaporated to dryness and the residue dissolved in water. After acidifying the 1,3-bis(8-allyl-2-carboxychromon-7-yloxy) propan-2-ol 2.3 parts melting indefinitely between 210 and 230° was collected at the pump.

*Analysis.*—$C_{29}H_{24}O_{11}H_2O$ requires (percent): C, 61.5; H, 4.6. Found (percent): C, 61.4; H, 4.7.

This acid was dissolved in equivalent amount of sodium bicarbonate solution and freeze-dried to obtain the disodium salt.

We claim:

1. A compound selected from the group consisting of bis-chromonyl compounds of the formula

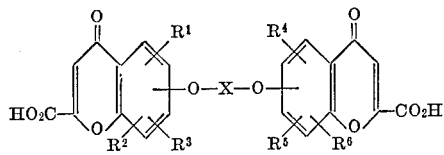

and therapeutically acceptable salts, esters and amides thereof, in which $R^1$, $R^2$, $R^3$, $R^4$, $R^5$ and $R^6$ are each selected from the group consisting of hydrogen atoms, lower alkyl, lower alkyl substituted by radicals selected from the group consisting of halogen, hydroxy, lower alkoxy, acetoxy, carboxy, amino, lower alkylamino, di-loweralkylamino, hydroxylamino and hydrazino, lower alkenyl, lower alkynyl, pyridyl, furyl, pyrrolyl, nitrile, amidine, nitro, nitroso, hydroxy, lower alkoxy, lower alkoxy substituted by radicals selected from the group consisting of hydroxy, lower alkoxy, carboxy, and halogen, lower alkenyloxy, lower alkynyloxy, benzyloxy, pyridyloxy, hydroxylamino, hydrazine, hydrazone, urea, thiourea, guanidine, thiol, and halogen; and X is selected from the group consisting of saturated and unsaturated, straight and branched polymethylene chains of 2 to 7 carbon atoms which may be interrupted by a member selected from the group consisting of benzene rings, dioxanyl, oxygen atoms and carbonyl groups, and which may be substituted by a member selected from the group consisting of halogen atoms, hydroxy groups and lower alkoxy groups, provided that at least one of $R^1$, $R^2$, $R^3$, $R^4$, $R^5$ and $R^6$ is a substituent other than a substituent selected from the group consisting of hydrogen, halogen, hydroxy, lower alkyl, lower alkoxy, hydroxy-lower alkyl, halo-lower alkyl, hydroxy-lower alkoxy, lower alkoxy-lower alkoxy and carboxy-lower alkoxy.

2. A compound selected from the group consisting of bis-chromonyl compounds of the formula:

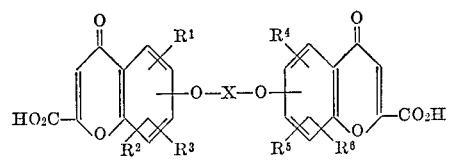

and therapeutically acceptable salts, esters and amides thereof, in which at least one of $R^1$, $R^2$, $R^3$, $R^4$, $R^5$ and $R^6$ is selected from the group consisting of hydroxy, lower alkoxy, carbonyl lower alkoxy, hydroxy lower alkoxy, lower alkoxy-lower alkoxy, unsaturated lower alkyl, nitro amino and cyano; the remainder of $R^1$, $R^2$, $R^3$, $R^4$, $R^5$ and $R^6$ are each selected from the group consisting of hydrogen, lower alkyl, halo lower alkyl, hydroxy lower alkyl and halogen; and X is selected from the group consisting of saturated and unsaturated, straight and branched polymethylene chains of 2 to 7 carbon atoms which may be interrupted by a member selected from the group consisting of benzene rings, dioxanyl, oxygen atoms and carbonyl groups and which may be substituted by a member selected from the group consisting of halogen atoms, hydroxy and lower alkoxy groups, provided that at least one of $R^1$, $R^2$, $R^3$, $R^4$, $R^5$ and $R^6$ is a substituent other than a substituent selected from the group consisting of hydrogen, halogen, hydroxy, lower alkyl, lower alkoxy, hydroxy-lower alkyl, halo-lower alkyl, hydroxy-lower alkoxy, lower alkoxy-lower alkoxy and carboxy-lower alkoxy.

3. A compound according to claim 2 wherein the hydrocarbon chain of the group X has from 2 to 7 carbon atoms.

4. A compound according to claim 2 wherein the group X is substituted by a hydroxyl group 5. A compound according to claim 2 wherein X is selected from the group consisting of 2-hydroxy-trimethylene and 3-hydroxy-pentamethylene groups.

6. A compound according to claim 2 in the form of an ammonium salt.

7. A compound according to claim 2 in the form of an alkali metal salt.

8. A compound according to claim 2 in the form of an alkaline earth metal salt.

9. A compound according to claim 2 in the form of an amine salt.

10. A compound according to claim 2 in the form of an ester.

11. A compound according to claim 2 in the form of an amide.

12. A compound selected from the group consisting of bis-chromonyl compounds of the formula

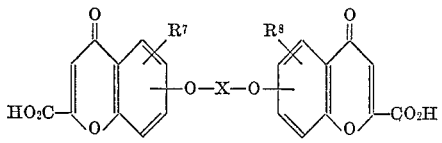

and therapeutically acceptable salts, esters and amides thereof, in which $R^7$ and $R^8$ are each selected from the group consisting of hydroxy, lower alkoxy, hydroxy lower alkoxy, lower alkoxy-lower alkoxy, carboxy lower alkoxy, unsaturated lower alkyl, nitro, amino and cyano groups; and X is selected from the group consisting of saturated and unsaturated, straight and branched polymethylene chains of 3 to 7 carbon atoms which may be interrupted by a member selected from the group consisting of benzene rings, dioxanyl, oxygen atoms and carbonyl groups, and which may be substituted by a member selected from the group of halogen atoms, hydroxy and lower alkoxy groups, provided that at least one of $R^1$, $R^2$, $R^3$, $R^4$, $R^5$ and $R^6$ is a substituent other than a substituent selected from the group consisting of hydrogen, halogen, hydroxy, lower alkyl, lower alkoxy, hydroxy-lower alkyl, halo-lower alkyl, hydroxy-lower alkoxy, lower alkoxy-lower alkoxy and carboxy-lower alkoxy.

13. A compound according to claim 12 wherein the hydrocarbon chain of the group X has from 3 to 7 carbon atoms.

14. A compound according to claim 12 wherein the group X is substituted by a hydroxyl group.

15. A compound according to claim 12 wherein the group X is selected from the group consisting of 2-hydroxy-trimethylene and 3-hydroxy-pentamethylene groups.

16. A compound according to claim 12 in the form of an ammonium salt.

17. A compound according to claim 12 in the form of an alkali metal salt.

18. A compound according to claim 12 in the form of an alkaline earth metal salt.

19. A compound according to claim 12 in the form of an amine salt.

20. A compound according to claim 12 in the form of an ester.

21. A compound according to claim 12 in the form of an amide.

22. A bis-chromonyl compound selected from:

1,3-bis(2-carboxy-7-methoxychromon-5-yloxy)-propan-2-ol;
1,5-bis(2-carboxy-7-methoxychromon-5-yloxy)-pentane;
1,3-bis(2-carboxy-5-(2-hydroxypropoxy)chromon-7-yloxy)propan-2-ol;
1,3-bis(2-carboxy-7-(2-hydroxypropoxy)chromon-5-yloxy)propan-2-ol;
1,5-bis(2-carboxy-5-methoxychromon-7-yloxy)-pentane;
1,5-bis(2-carboxy-7-(2-hydroxypropoxy)-chromon-6-yloxy)-pentane;
1,3-bis(5-benzyloxy-2-carboxychromon-7-yloxy)-propan-2-ol;
1,3-bis(2-carboxy-5-methoxy-chromon-7-yloxy)-propan-2-ol;
1,3-bis(2-carboxy-5-hydroxychromon-7-yloxy)-propan-2-ol;
1,3-bis(8-allyl-2-carboxychromon-5-yloxy)-propan-2-ol;
1,3-bis(8-allyl-2-carboxychromon-7-yloxy)-propan-2-ol;
1-(8-allyl-2-carboxychromon-7-yloxy)-3-(2-carboxychromon-7-yloxy)-propan-2-ol;
1,3-bis(2-carboxy-8-methalylchromon-7-yloxy)-propan-2-ol;
1,3-bis(8-allyl-6-bromo-2-carboxychromon-7-yloxy)-propan-2-ol;
1-(8-allyl-2-carboxychromon-7-yloxy)-3-(2-carboxychromon-6-yloxy)-propan-2-ol;
1,5-bis(8-allyl-2-carboxychromon-7-yloxy)-pentane;
1,3-bis(2-carboxy-8-nitrochromon-5-yloxy)-propan-2-ol;

and therapeutically acceptable salts, esters and amides thereof.

23. A compound of the formula

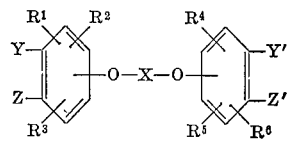

wherein $R^1$, $R^2$, $R^3$, $R^4$, $R^5$, $R^6$ and X are as defined in claim 22, Z is a hydroxy group and Y is a member of the group of a hydrogen atom, —COCH$_3$ or —COOR' wherein R' is a lower alkyl group, or Y and Z together form a chain

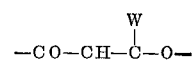

or a chain

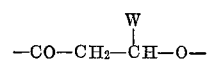

wherein W is a carboxylic group, Y' and Z' have the same meanings as Y and Z and may be the same as or different from Y and Z, with the proviso that not more than one of Y and Z or Y' and Z' together represent a chain —CO—CH=C(COOH)—O—.

References Cited
UNITED STATES PATENTS 3,002,979  10/1961  Klosa _____ 260—345.2
3,046,275  7/1962  Kohlstaedt et al. _ 260—345.2 XR
3,358,000  12/1967  Vincent _____ 260—345.2
3,419,578  12/1968  Fitzmaurice et al. ___ 260—345.2

HENRY R. JILES, Primary Examiner
J. M. FORD, Assistant Examiner

U.S. Cl. X.R.
260—345.5, 326.3, 295, 999, 340.6, 294.8, 294.9, 613, 470, 592, 473